United States Patent
Abela et al.

(10) Patent No.: US 10,529,016 B2
(45) Date of Patent: Jan. 7, 2020

(54) METHOD AND SYSTEM FOR PRE-TRANSACTION INSTALLMENT PAYMENT SOLUTION AND SIMULATION OF INSTALLMENT

(71) Applicant: MasterCard International Incorporated, Purchase, NY (US)

(72) Inventors: Ruth Elizabeth Abela, London (GB); Dominique Steenbeek, Wavre (BE); Anna Elizaveta Libus, Surrey (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 908 days.

(21) Appl. No.: 15/074,199

(22) Filed: Mar. 18, 2016

(65) Prior Publication Data

US 2017/0270604 A1    Sep. 21, 2017

(51) Int. Cl.
   *G06Q 40/02* (2012.01)
   *G06Q 20/08* (2012.01)
   *G06Q 20/40* (2012.01)

(52) U.S. Cl.
   CPC ........ *G06Q 40/025* (2013.01); *G06Q 20/085* (2013.01); *G06Q 20/40* (2013.01)

(58) Field of Classification Search
   CPC ............................. G06Q 40/00; G06Q 40/025
   USPC ........................................................ 705/40
   See application file for complete search history.

(56) References Cited

U.S. PATENT DOCUMENTS

| 7,248,855 B2 | 7/2007 | Joyce et al. |
| 7,475,044 B1 * | 1/2009 | Kawai .................... G06Q 20/04 235/380 |
| 2014/0089191 A1 | 3/2014 | Brown |

(Continued)

FOREIGN PATENT DOCUMENTS

RU         2 555 233 C2    7/2015

OTHER PUBLICATIONS

U.S. Appl. No. 62/160,328, entitled "Method and System for Pos Enabled Installments with Eligibility Check Requirements," filed May 12, 2015 by Vijila Sudhakar et al.

(Continued)

*Primary Examiner* — Robert R Niquette
*Assistant Examiner* — Liz P Nguyen
(74) *Attorney, Agent, or Firm* — Buchanan Ingersoll & Rooney PC

(57) ABSTRACT

A method for flagging a pre-approved installment transaction for issuer processing includes: receiving installment data, wherein the installment data is related to an installment transaction pre-approved by an issuing financial institution and includes a primary account number, pre-approved amount, and transaction criteria; receiving a transaction message including the primary account number, a transaction amount, and transaction data; verifying compliance of the payment transaction with the installment transaction based on a correspondence between the pre-approved amount and transaction amount and the transaction criteria with the transaction data; storing an installment flag in the transaction message upon successful verification; and transmitting the transaction message including the installment flag to the issuing financial institution via the payment network.

20 Claims, 7 Drawing Sheets

(56) References Cited

U.S. PATENT DOCUMENTS

2015/0269667 A1   9/2015  Grossman
2016/0364724 A1*  12/2016 Wang .................... G06Q 20/40

OTHER PUBLICATIONS

International Search Report and Written Opinion issued by the International Search Authority dated Apr. 5, 2017 in corresponding PCT Application No. PCT/US2017/017753 (16 pages).
Decision to Grant dated May 27, 2019, by the Patent Office of the Russian Federation in corresponding Russian Patent Application No. 2018136585, and an English translation of the Decision. (40 pages).

* cited by examiner

METHOD AND SYSTEM FOR PRE-TRANSACTION INSTALLMENT PAYMENT SOLUTION AND SIMULATION OF INSTALLMENT

FIELD

The present disclosure relates to the flagging and processing of pre-approved installment transactions, specifically the pre-approval of a payment transaction by an issuing financial institution for processing as an installment and the flagging of the transaction as such during processing without requiring modification to existing point of sale systems.

BACKGROUND

Installments are used throughout the world to enable consumers to make purchases that they may otherwise be unable to make. In some places, merchants manage installments, enabling a consumer to purchase a product and pay for that product over time. In other places, issuing financial institutions ("issuers") may manage installments, paying for a purchase on behalf of the consumer and then charging that consumer's transaction account for the purchase over time. In either instance, the consumer is able to make their purchase immediately, and pay it off over time, which can be beneficial if the consumer has a low credit limit, is unable to build up savings, etc.

In many instances, installments either at the time of a transaction or after the transaction has already been processed. For instance, an installment managed by a merchant is often created at the point of sale during the checkout process, where the transaction is processed for the regular installment amount and the consumer charged the additional installments at the agreed period of time. Installments managed by issuers are often created after a transaction has been processed, where the consumer may identify a processed transaction that the issuer does not immediately charge to the consumer, but instead charges installment amounts at predetermined installment periods to the consumer's account. For installments created after a transaction has been processed, the consumer must have the full purchase amount initially available for the purchase, which may be unfeasible and go against one of the primary benefits of an installment. Additional information regarding the creation of installments subsequent to transaction processing can be found in U.S. patent application Ser. No. 14/219,215, entitled "Method and System for Consumer Behavior Modeling Based on Installment Payments," filed Mar. 19, 2014 by David Grossman; and U.S. Provisional Patent Application No. 62/160,328, entitled "Method and System for POS Enabled Installments with Eligibility Check Requirements," filed May 12, 2015 by Vijila Sudhakar et al., which are herein incorporated by reference in their entirety.

Thus, there is a need for a technical solution that can enable initially processing a transaction as an installment, without the need for modification to existing points of sale and without adversely affecting involved merchants. Such a solution would enable merchants to transact normally and consumers to utilize installments without the need for availability of the full purchase amount. By pre-approving a transaction for processing as an installment, a transaction could be flagged during its processing to ensure that it is processed correctly as an installment, which would increase the efficiency of such processing.

SUMMARY

The present disclosure provides a description of systems and methods for flagging pre-approved installment transactions and processing transactions as installments based on pre-approval.

A method for flagging a pre-approved installment transaction for issuer processing includes: receiving, by a receiving device of a processing server, a data signal superimposed with installment data, wherein the installment data is related to an installment transaction pre-approved by an issuing financial institution, the installment data including at least a primary account number, a pre-approved amount, and one or more transaction criteria; receiving, by the receiving device of the processing server, a transaction message from a payment network, wherein the transaction message is formatted based on one or more standards and includes data related to a payment transaction including at least a plurality of data elements including at least a first data element configured to store the primary account number, a second data element configured to store a transaction amount, and one or more additional data elements configured to store transaction data; verifying, by a verification module of the processing server, compliance of the payment transaction with the installment transaction, based on a correspondence between at least the pre-approved amount and transaction amount and the one or more transaction criteria with the transaction data; storing, by a transaction processing module of the processing server, an installment flag in a third data element included in the plurality of data elements included in the transaction message upon successful verification; and electronically transmitting, by a transmitting device of the processing server, the transaction message including the third data element storing the installment flag to the issuing financial institution via the payment network.

A method for processing a payment transaction as an installment based on pre-approval includes: storing, in an account database of a processing server, an account profile, wherein the account profile includes data related to a transaction account including at least a primary account number, an account balance, and account data; receiving, by a receiving device of the processing server, a data signal superimposed with installment data, wherein the installment data is related to a requested installment transaction, the installment data including at least the primary account number, an installment amount, one or more payment terms, and one or more transaction criteria; pre-approving, by a transaction processing module of the processing server, the installment transaction based on at least the installment amount, one or more payment terms, account balance, and the account data; electronically transmitting, by a transmitting device of the processing server, a data signal superimposed with at least an indication of pre-approval for the requested installment transaction; receiving, by the receiving device of the processing server, a transaction message from a payment network, wherein the transaction message is formatted based on one or more standards and includes data related to a payment transaction including at least a plurality of data elements including at least a first data element configured to store the primary account number, a second data element configured to store a transaction amount, and one or more additional data elements configured to store transaction data; and posting, to the transaction account related to the account profile, a charge for an amount based on at least the installment amount, one or more payment terms, and the transaction amount.

A system for flagging a pre-approved installment transaction for issuer processing includes: a receiving device of a processing server configured to receive a data signal superimposed with installment data, wherein the installment data is related to an installment transaction pre-approved by an issuing financial institution, the installment data including at least a primary account number, a pre-approved amount, and one or more transaction criteria, and receive a transaction message from a payment network, wherein the transaction message is formatted based on one or more standards and includes data related to a payment transaction including at least a plurality of data elements including at least a first data element configured to store the primary account number, a second data element configured to store a transaction amount, and one or more additional data elements configured to store transaction data; a verification module of the processing server configured to verify compliance of the payment transaction with the installment transaction, based on a correspondence between at least the pre-approved amount and transaction amount and the one or more transaction criteria with the transaction data; a transaction processing module of the processing server configured to store an installment flag in a third data element included in the plurality of data elements included in the transaction message upon successful verification; and a transmitting device of the processing server configured to electronically transmit the transaction message including the third data element storing the installment flag to the issuing financial institution via the payment network.

A system for processing a payment transaction as an installment based on pre-approval includes: an account database of a processing server configured to store an account profile, wherein the account profile includes data related to a transaction account including at least a primary account number, an account balance, and account data; a receiving device of the processing server configured to receive a data signal superimposed with installment data, wherein the installment data is related to a requested installment transaction, the installment data including at least the primary account number, an installment amount, one or more payment terms, and one or more transaction criteria; a transaction processing module of the processing server configured to pre-approve the installment transaction based on at least the installment amount, one or more payment terms, account balance, and the account data; and a transmitting device of the processing server configured to electronically transmit a data signal superimposed with at least an indication of pre-approval for the requested installment transaction. The receiving device of the processing server is further configured to receive a transaction message from a payment network, wherein the transaction message is formatted based on one or more standards and includes data related to a payment transaction including at least a plurality of data elements including at least a first data element configured to store the primary account number, a second data element configured to store a transaction amount, and one or more additional data elements configured to store transaction data. The transaction processing module of the processing server is further configured to post, to the transaction account related to the account profile, a charge for an amount based on at least the installment amount, one or more payment terms, and the transaction amount.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
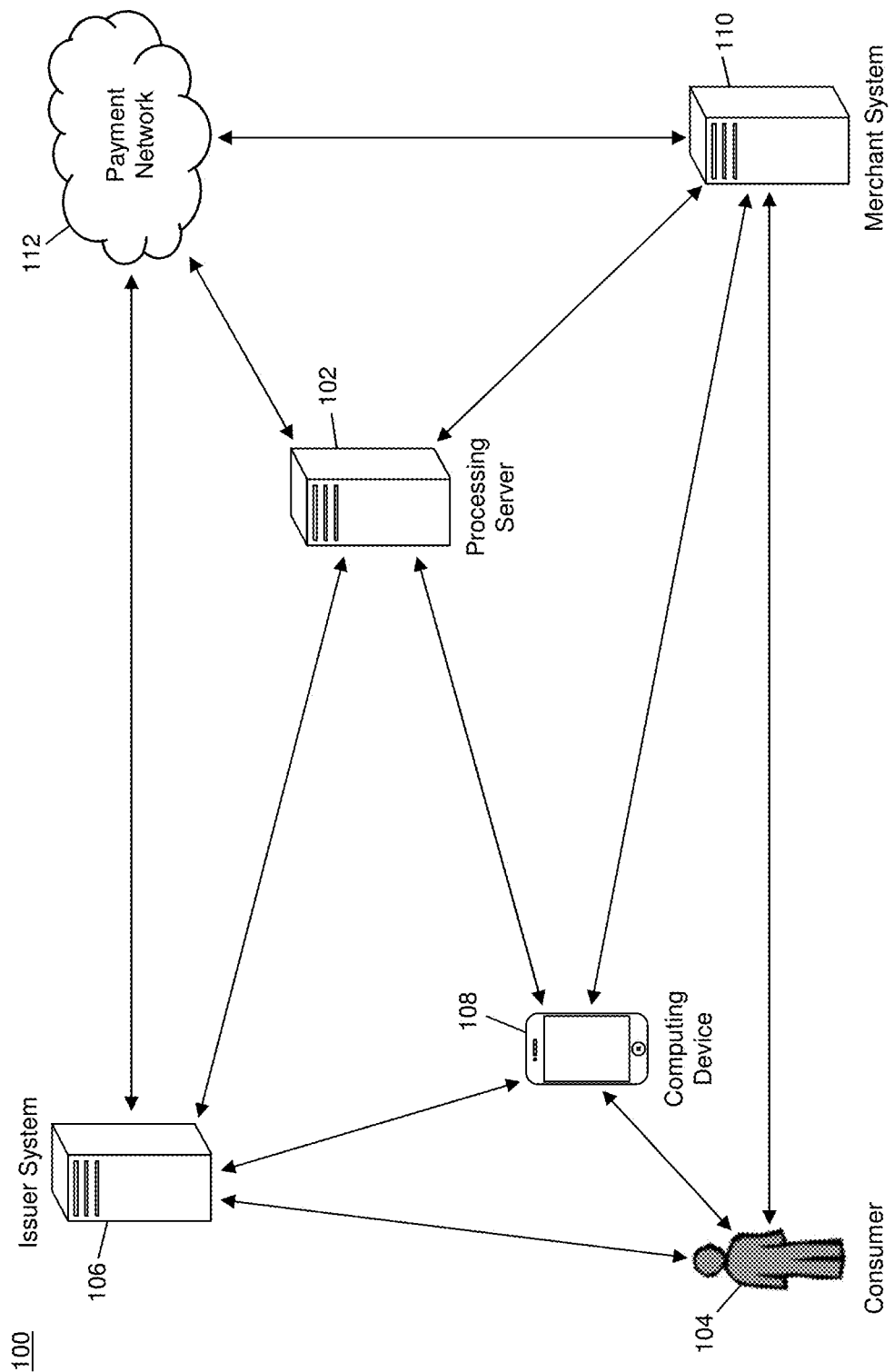
FIG. 1 is a block diagram illustrating a high level system architecture for the pre-approval and subsequent processing of installment transactions in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Payment Rails—Infrastructure associated with a payment network used in the processing of payment transactions and the communication of transaction messages and other similar data between the payment network and other entities interconnected with the payment network. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

System for Pre-Approval and Processing of Installment Transactions

FIG. 1 illustrates a system 100 for the pre-approval of installment transactions and the flagging of transactions during processing for processing as installments as a result of the pre-approval.

The system 100 may include a processing server 102. The processing server 102, discussed in more detail below, may be configured to pre-approve installment transactions based on selected simulation criteria for a transaction, flag payment transactions during processing for processing as an installment transaction, and the processing of installment transactions based on pre-approval. In some instances, the processing server 102 may be configured to perform one or more of the above functions based on its position in the system 100, as discussed below.

In the system 100, a consumer 104 may have a desire to make a purchase via installments rather than purchase the product (e.g., goods and/or services) via a single payment transaction where payment is required in full at the time of the transaction. The consumer 104 may have a transaction account established with an issuing financial institution, such as an issuing bank. The transaction account may be stored in, managed by, or otherwise associated with an issuer system 106, which may be a computing system operated by or on behalf of the issuing financial institution. In some embodiments, the processing server 102 may be a part of the issuer system 106, or the issuer system 106 may include a processing server 102, such that the issuer system 106 may be configured to pre-approve installment transactions as performed by the processing server 102 and discussed herein.

To seek pre-approval of an installment transaction, the consumer 104 may use a computing device 108 to simulate a transaction and its processing as an installment transaction. The computing device 108 may be any type of computing device suitable for performing the functions discussed herein, such as a desktop computer, laptop computer, notebook computer, tablet computer, cellular phone, smart phone, smart watch, smart television, wearable computing device, implantable computing device, etc. Interactions between the computing device 108 and consumer 104 may be performed using one or more application programs stored on and executed by the computing device 108, such as a specially configured application program for simulating transactions as installment transactions or a web browsing application program configured to navigate to a website configured for simulating transactions as installment transactions.

As part of the simulation, the consumer 104 may input one or more transaction criteria for the transaction they want to process as an installment transaction. The one or more transaction criteria may include any criteria suitable for the identification of a subsequent transaction for identification and matching to the simulated transaction. The transaction criteria may include, for example, a transaction time, transaction data, merchant identifier, merchant name, merchant category code, product data, geographic location, etc. The consumer 104 may also input an estimated transaction amount, which may be the consumer's estimate of the transaction amount for the payment transaction that they would like processed as an installment transaction.

The consumer 104 may then select, using the computing device 108, one or more terms for the desired installment. The one or more terms may include an installment payment amount, a number of payments, an installment period (e.g., total period or recurring payment period), interest rate, etc. In some cases, the consumer 104 may select one term, which may affect other terms. For example, the consumer 104 may select a desired number of payments, which may be used in the calculation of an estimated installment payment amount. In another example, the consumer 104 may select their desired installment payment amount, which may be used to determine a suitable number of payments and installment period. The interface used by the consumer 104 via the computing device 108 may include sliders, drop-down boxes, radio buttons, and other suitable interface elements for the selection of installment terms. In some instances, additional terms that may not be affected by the consumer's selections, as well as terms modified by the consumer's selections, may be displayed to the consumer 104 and modified accordingly during the consumer's selection process.

Once the consumer 104 has simulated the installment transaction and is satisfied with the result, the consumer 104 may submit the simulation for pre-approval by the issuer system 106. In some instances, the simulation may be electronically transmitted to the processing server 102 via a suitable communication network and method, which may then forward the simulation to the issuer system 106 for pre-approval. In other instances, the processing server 102 may be a part of the issuer system 106 and may perform the pre-approval of the simulated installment transaction. In such instances, functions performed by the issuer system 106 discussed herein may be performed by the processing server 102 as part of the issuer system 106.

The issuer system 106 may receive the simulated installment transaction from the computing device 108, which may include at least an identifier for the transaction account associated with the consumer 104, the one or more transaction criteria submitted by the consumer 104, and the one or more installment terms. The identifier may be a primary account number, identification number, email address, username, telephone number, device identifier, or other identification value suitable for use in identification of a transaction account associated with the consumer 104. In some instances, the one or more installment terms may include only those terms selected by the consumer 104. In other instances, the installment terms may include additional installment terms that may or may not be modified based on the terms selected by the consumer 104.

The issuer system 106 may then pre-approve or deny the simulated installment, based on the account balance of the associated transaction account, the installment terms, and any other suitable consideration. For example, the issuer system 106 may perform risk analysis, credit analysis, etc. to determine pre-approval of the simulated installment transaction. If the simulated installment transaction is not pre-approved, the issuer system 106 may electronically transmit a data signal superimposed with an indication of the denial of the simulated installment transaction to the computing device 108 (e.g., via the processing server 102, if applicable) using a suitable communication network and method. In some instances, the indication may be accompanied by one or more alternative terms proposed by the issuer system 106, such as modifications to the installment payment amount, interest rate, number of payments, etc. In such instances, the consumer 104 may accept the modified terms or may present further modifications to the terms and resubmit the simulated installment transaction.

If the issuer system 106 pre-approves the simulated installment transaction or receives approval from the consumer 104 via the computing device 108 of acceptance of modified installment terms for the simulated installment transaction, the issuer system 106 may notify the computing device 108 accordingly and may store data associated with the simulated installment transaction. In some instances, the issuer system 106 may store the simulated installment transaction data (e.g., account identifier, terms, etc.) in a profile associated with the transaction account. In other instances, the issuer system 106 may store the simulated installment transaction data in a dedicated database used for storage of installment transaction data.

In some embodiments, the simulated installment transaction may be a simulation of an e-commerce transaction being initiated by the consumer 104. For instance, the consumer 104 may navigate to a web site associated with a merchant and select one or more products for purchase using traditional e-commerce methods. As part of the checkout process, the consumer 104 may be presented (e.g., via the computing device 108) with the interface for use in selecting one or more installment terms, which may be based in part on the transaction data for the payment transaction corresponding to the selected products. For example, the estimated transaction amount may be based on the total amount of the products selected for check out by the consumer 104. The consumer 104 may then submit the simulated installment transaction for pre-approved by the issuer system 106.

In some embodiments, the consumer 104 may submit the transaction data for the payment transaction indicated via the products selected for check-out to the issuer system 106 prior to the selection of installment terms. In such an embodiment, the issuer system 106 may first identify installment terms suitable for pre-approval based on data associated with the consumer's transaction account. The issuer system 106 may then return the suitable installment terms to the consumer 104 via the computing device 108. The consumer 104 may select the desired installment terms and may resubmit the simulated installment transaction to the issuer system 106 for a finalized pre-approval, or may, as discussed below, submit the transaction for processing with the selected installment terms included.

Once the simulated installment transaction is pre-approved, the installment transaction data may be electronically transmitted to the processing server 102 for use in flagging a transaction during processing. The processing server 102 may store the data in an internal, external, or otherwise accessible database for use in flagging a payment transaction. In some embodiments, the processing server 102 may be a part of a payment network 112 involved in the processing of payment transactions. In other embodiments, the processing server 102 may be separate from the payment network 112, but may be in communication therewith, for the receipt of transaction messages for payment transactions for identification as being associated with simulated installment transactions for processing. In some embodiments, the issuer system 106 and payment network 112 may both include a processing server 102, which may be configured to perform the functions associated with each entity, respectively.

Following the pre-approval process, the consumer 104 may initiate a payment transaction with a merchant using any suitable method for the initiation of a payment transaction. The payment transaction may be an in-person transaction, such as at a physical location of the merchant, or may be a remote transaction, such as conducted via the Internet. As part of the initiation of the payment transaction, the consumer 104 may furnish payment details to a merchant system 110 (e.g., a point of sale system) associated with the merchant. The payment details may include data associated with the transaction account used by the consumer 104 in the simulation of the installment transaction, and may be conveyed to the merchant system 110 using any suitable method, such as via a physical payment card, electronic transmission from the computing device 108, etc. The merchant system 110 may receive the payment details and may submit the payment details and additional transaction data for processing. The payment details and additional transaction data may be submitted directly to the payment network 112 or processing server 102, or via one or more intermediate entities, such as acquiring financial institutions and gateway processors. In some instances, the data may be electronically transmitted via payment rails associated with and operated by the payment network 112. Methods and systems for the transmission of data associated with payment transactions and hardware and systems involved therein are discussed in more detail below with respect to the process 600 illustrated in FIG. 6.

As part of the processing of the payment transaction, the processing server 102 may receive a transaction message for the payment transaction. In some instances, the processing server 102 may receive the transaction message directly from the merchant system 110 or an associated system (e.g., the system of an associated acquiring financial institution) via the payment rails. In other instances, the processing server 102 may receive the transaction message from the payment network 112, such as forward to the processing server 102 via the payment rails. The transaction message may be a specially formatted data message formatted pursuant to one or more standards governing the exchange of financial transaction messages, such as the International Organization of Standardization's ISO 8583 standard. Transaction messages may include a plurality of data elements configured to store data, which may store data as set forth in the associated standard(s). In some instances, a transaction message may also include a bitmap, which may indicate the data elements included therein and data stored in the included data elements. Transaction messages may also include a message type indicator, which may indicate a type for the transaction message, such as an authorization request, authorization response, etc.

The transaction message submitted to the processing server 102 for the payment transaction involving the consumer 104 and merchant may include a message type indicator indicative of an authorization request and may include a plurality of data elements including a first data element configured to store a primary account number associated with the transaction account used in the simulation, a second data element configured to store a transaction amount, and one or more additional data elements configured to store additional transaction data. The additional transaction data may include, for example, a transaction time, transaction date, merchant category code, merchant identifier, merchant name, geographic location, product data, merchant data, consumer data, reward data, loyalty data, offer data, etc.

The processing server 102 may compare the additional transaction data and transaction amount stored in the corresponding data elements with the transaction criteria submitted for the pre-approved installment transaction, to determine if the transaction message is for a payment transaction that matches the pre-approved installment transaction. A match may be indicated if the transaction criteria matches transaction data stored in the corresponding data elements of the transaction message, and if the transaction amount is within a predetermined range of the amount indicated in the pre-approved installment transaction. The predetermined range may be a percentage, set amount (e.g., set by the issuer system 106, consumer 104, or processing server 102), or other range, such as to accommodate for variances in price, additional products, sales tax, etc. In some embodiments, the payment transaction must also be submitted within a predetermined period of time of the pre-approval of the installment transaction. The predetermined period of time may be set by the issuer system 106 or processing server 102, and compliance therewith may be determined based on a time when the simulated installment transaction was received and a transaction time and/or date stored in corresponding data elements included in the transaction message.

If the payment transaction does not match a pre-approved installment transaction, the payment transaction may be processed using traditional methods and systems, such as described below with respect to the process 600 illustrated in FIG. 6. If the payment transaction does match a pre-approved installment transaction, the processing server 102 may flag the transaction. In some embodiments, flagging the payment transaction may include storing, in a specific data element included in the transaction message, an indication that the payment transaction is to be converted into an installment transaction. The modified transaction message may then be electronically transmitted to the issuer system 106 via the payment network 112 and/or payment rails. In other embodiments, the processing server 102 may electronically transmit a second data signal to the issuer system 106 in addition to the transaction message, which includes an indication that the transaction message corresponds to a pre-approved installment transaction. In some instances, the second data signal or specific data element may include additional data used to identify the corresponding pre-approved installment transaction, such as a transaction identification number or value.

The issuer system 106 may receive the transaction message as well as the indication that the payment transaction corresponds to a pre-approved installment transaction. The issuer system 106 may then process the payment transaction as an installment, using traditional methods and systems. For instance, the issuer system 106 may approve the payment transaction in full for payment of the transaction amount to the merchant, but may charge the transaction account for the consumer 104 for the initial installment amount, posting additional charges for installment amounts with additional interest at the predetermined installment periods. As part of the approval of the payment transaction, a transaction message that includes a response code indicative of approval may be electronically transmitted back to the merchant system 110 via the payment network, which may also include a message type indicator indicative of an authorization response. In some embodiments, the issuer system 106 may verify that the transaction message corresponds to a pre-approved installment transaction prior to processing as an installment transaction. The verification may include comparing the transaction amount and transaction data stored in the corresponding data elements included in the transaction message with the transaction criteria in the pre-approved installment transaction.

In some embodiments, the consumer 104 may be required to provide confirmation of the conversion of the payment transaction into an installment, such as to confirm that the correct payment transaction was flagged for conversion. In such embodiments, when the issuer system 106 receives the transaction message and flag, the issuer system 106 may electronically transmit a data signal to the computing device 108 associated with the consumer 104 that includes an indication that confirmation of the conversion is required. In some cases, the indication may be accompanied by transaction data for the payment transaction and/or the pre-approved installment transaction. The consumer 104 may then, using the computing device 108, provide confirmation of the conversion to the installment transaction, which may be electronically transmitted back to the issuer system 106. If the consumer 104 does not approve, then the issuer system 106 may process the payment transaction using traditional processing methods and systems.

In some instances, the issuer system 106 may modify the installment terms for the conversion to the installment transaction to vary from the pre-approved installment terms. In such instances, the prompt to the consumer 104 for approval may include and indicate the modified installment terms. The consumer 104 may then accept or decline the conversion to the installment transaction with the modified installment terms, and the issuer system 106 process the transaction accordingly. In some cases, the consumer 104 may be able to propose additional modifications to the installment terms, which may be accepted or declined by the issuer system 106 and processed accordingly.

Methods and systems discussed herein enable installment transactions to be pre-approved such that payment transactions can be flagged during processing for conversion into installment transactions. The specialized configuration of the processing server 102 may enable such actions to be performed without modification to merchant systems 110, and thus utilize legacy point of sale software and hardware, while enabling consumers 104 to use installment transactions to pay for purchases. In addition, by being configured to flag payment transactions during processing and before the transaction is paid for by the consumer 104, the processing server 102 can ensure that a transaction is processed without the consumer 104 having to pay the full purchase amount, which may increase the consumer's ability to engage in transactions and thus increase consumer convenience and issuer revenue.

Processing Server

Figure 2:
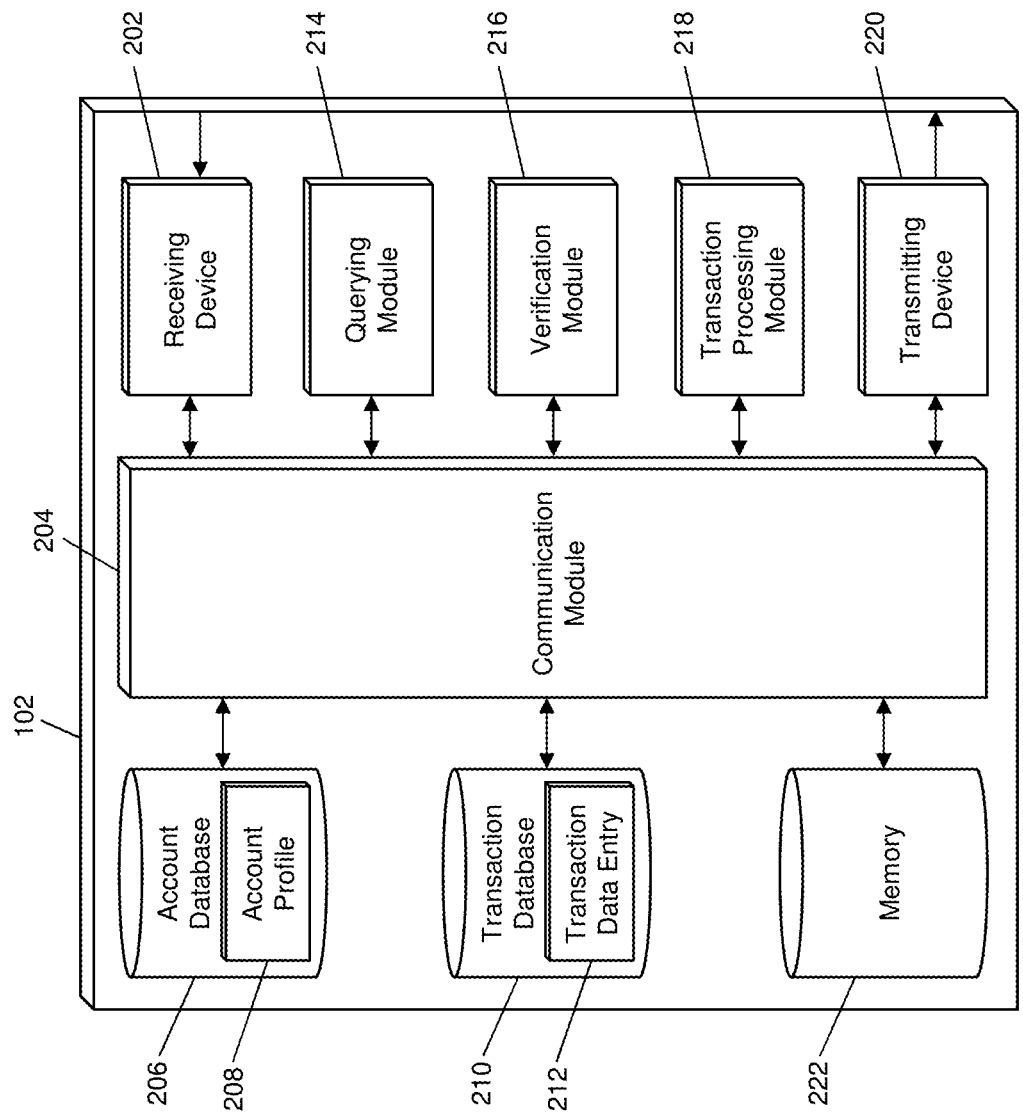
FIG. 2 is a block diagram illustrating the processing server of FIG. 1 for the pre-approval and processing of installment transactions in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 112 for the transmission of transaction messages that include sensitive financial data and information. In some instances, the receiving device 202 may also be configured to receive data from issuer systems 106, computing devices 108, merchant systems 110, payment networks 112, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein. In some embodiments, the receiving device 202 may be configured to receive data signals electronically transmitted via an application programming interface (API).

The receiving device 202 may be configured to receive data signals electronically transmitted by computing devices 108 that are superimposed with simulated installment transactions. The receiving device 202 may also be configured to receive data signals electronically transmitted by computing devices 108 that are superimposed with confirmations for conversions of payment transactions to installment transactions, modifications to installment terms, and indications of pre-approval of a simulated installment transaction by an issuer system 106. In some cases, the receiving device 202 may receive data signals electronically transmitted by computing devices 108 via an API. In instances where the processing server 102 is not part of the issuer system 106, the receiving device 202 may receive data signals electronically transmitted by the issuer system 106, such as may be superimposed with pre-approved installment transactions, authorization responses for payment transactions, etc., which may also be electronically transmitted via an API executed by the processing server 102 or the issuer system 106. The receiving device 202 may also receive transaction messages via the payment network 112 and payment rails, such as may be electronically transmitted directly by the merchant system 110 or intermediate entity, or as forwarded by the payment network 112.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, a verification module 216, a transaction processing module 218, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account. Each account profile 208 may include at least a primary account number, an account balance, and account data. The primary account number may be a number associated with the related transaction account used in payment transactions and installment transactions involving the related transaction account. The account balance may be a balance, credit limit, or other value used in determining approval of installment transactions and payment transactions involved in the related transaction account. The account data may include additional data associated with the related transaction account, which may be used in determining pre-approval of simulated installment transactions, such as data regarding credit worthiness, income, etc.

The processing server 102 may also include a transaction database 210. The transaction database 210 may be configured to store a plurality of transaction data entries 212 using a suitable data storage format and schema. The transaction database 210 may be a relational database that utilizes structured query language for the storage, identification, modifying, updating, accessing, etc. of structured data sets stored therein. Each transaction data entry 212 may be a structured data set configured to store data related to a transaction, such as a payment transaction or a pre-approved installment transaction. Each transaction data entry 212 may include a transaction message that includes transaction data, or may otherwise include transaction data, which may be related to a pre-approved simulated installment transaction. The data related to the pre-approved simulated installment transaction may include at least the one or more transaction criteria, one or more installment terms, and a primary account number associated with the transaction account to which the installment transaction was pre-approved.

The processing server 102 may include a querying module 214. The querying module 214 may be configured to execute queries on databases to identify information. The querying module 214 may receive one or more data values or query strings, and may execute a query string based thereon on an indicated database, such as the account database 206 or transaction database 210, to identify information stored therein. The querying module 214 may then output the identified information to an appropriate engine or module of the processing server 102 as necessary. The querying module 214 may, for example, execute a query on the account database 206 to identify an account profile 208 related to a received simulated installment transaction for use in determining pre-approval of the simulated installment transaction. The querying module 214 may also be configured to execute a query on the transaction database 210 to identify a transaction data entry 212 for a pre-approved installment transaction for matching to a received transaction message.

The processing server 102 may also include a verification module 216. The verification module 216 may be configured to verify that a transaction message corresponds to a pre-approved installment transaction. The verification module 216 may be configured to receive a transaction message and a transaction data entry 212 as input, may compare the data included in the data elements of the transaction message and in the transaction data entry 212, and may output a result of the comparison to indicate if the transaction message is verified as corresponding to a pre-approved installment transaction or not. The comparison may include, for example, comparing a transaction time in the transaction message as being within a predetermined period of time of when the transaction data entry 212 was stored or the corresponding pre-approval was received, comparing the transaction amount in the transaction message as being within a predetermined amount of a pre-approved amount, etc.

The processing server 102 may also include a transaction processing module 218. The transaction processing module 218 may be configured to perform functions related to the processing of payment transactions and installment transactions. The transaction processing module 218 may be configured to receive simulated installment transaction data and, based on an account profile 208 related to a transaction account indicated (e.g., by the primary account number or other identification value) in the installment transaction data, pre-approve the simulated installment transaction. The transaction processing module 218 may also be configured to identify alternative installment terms for pre-approval of a simulated installment transaction. The transaction processing module 218 may be further configured to modify transaction messages to include flags indication relation to a pre-approved installment transaction, and to convert payment transactions to installment transactions. Such a conversion may include approving a payment transaction by generating an authorization response indicating approval for the payment transaction and posting a charge to the involved transaction account for the installment amount and any interest at predetermined installment periods. Additional functions performed by the transaction processing module 218 related to the processing of payment transactions will be apparent to persons having skill in the relevant art.

The processing server 102 may also include a transmitting device 220. The transmitting device 214 may be configured to transmit data over one or more networks via one or more network protocols. In some embodiments, the transmitting device 220 may be configured to transmit data over the payment rails, such as using specially configured infrastructure associated with payment networks 112 for the transmission of transaction messages that include sensitive financial data and information, such as identified payment credentials. In some instances, the transmitting device 220 may be configured to transmit data to issuer systems 106, computing devices 108, merchant systems 110, payment networks 112, and other entities via alternative networks, such as the Internet. In some embodiments, the transmitting device 220 may be comprised of multiple devices, such as different transmitting devices for transmitting data over different networks, such as a first transmitting device for transmitting data over the payment rails and a second transmitting device for transmitting data over the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission. In some embodiments, the transmitting device 220 may be configured to electronically transmit data signals via an API.

The transmitting device 220 may be configured to electronically transmit data signals to issuer systems 106 that are superimposed with simulated installment transaction data, transaction messages for payment transactions, indications of relations of transaction messages to pre-approved installment transactions, etc. The transmitting device 220 may also be configured to electronically transmit data signals to computing devices 108, such as may be superimposed with indications of pre-approval for simulated installment transactions, requests for confirmation of installment terms, request for confirmation of conversion of a payment transaction to an installment transaction, etc. In some embodiments, the transmitting device 220 may electronically transmit data signals to the issuer system 106 and/or computing devices 108 via an API, which may be executed by the processing server 102 and/or issuer system 106. The transmitting device 220 may also be configured to electronically transmit transaction messages to the payment network 112, such as for forwarding to issuer systems 106, merchant systems 110, and entities associated therewith (e.g., acquiring financial institutions).

The processing server 102 may also include the memory 222. The memory 222 may be configured to store data for use by the processing server 102 in performing the functions discussed herein. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art.

Process for Pre-Approval and Processing of an Installment Transaction

Figure 3:
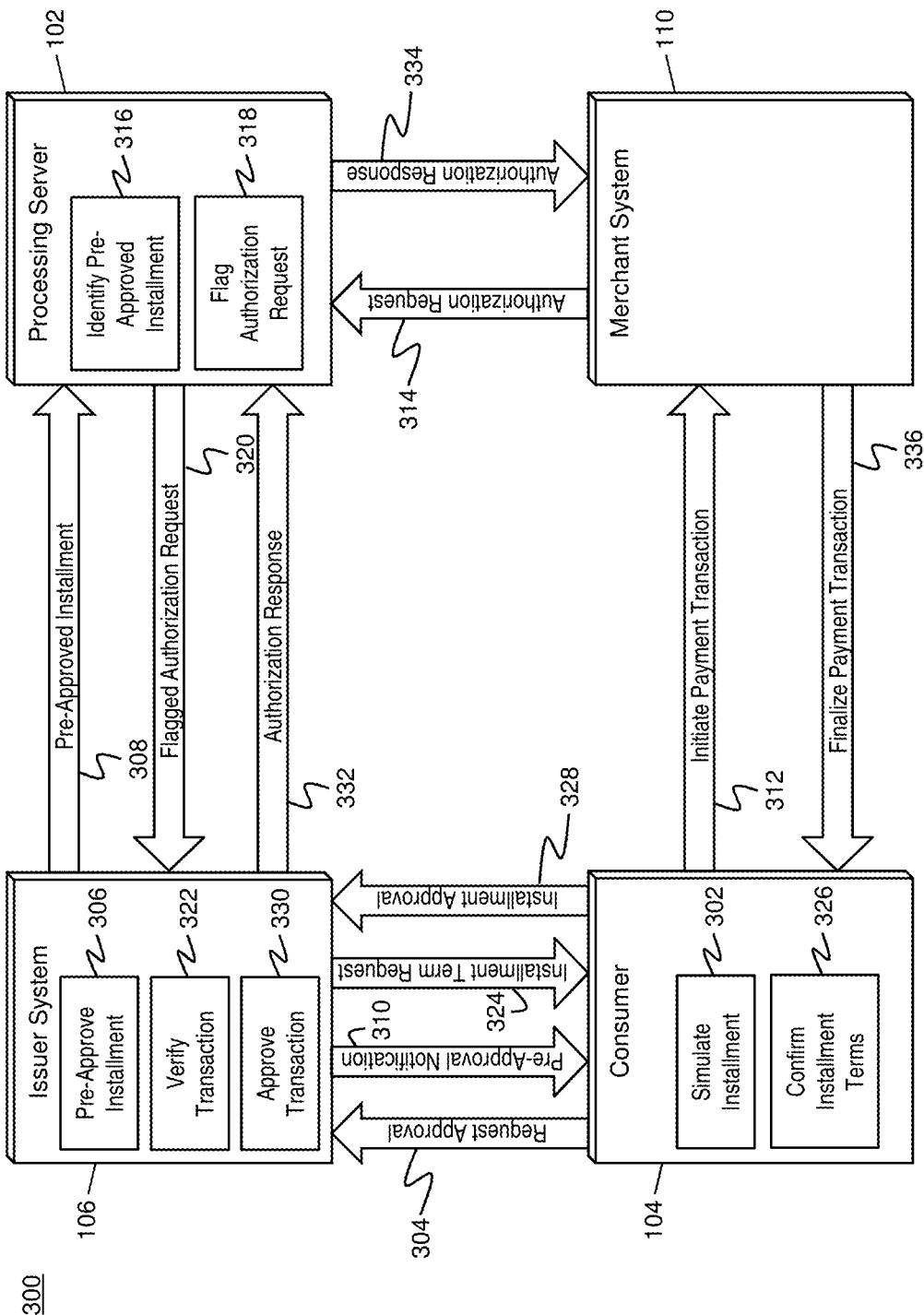
FIG. 3 is a flow diagram illustrating the pre-approval and processing of an installment transaction using the system of FIG. 1 in accordance with exemplary embodiments.

FIG. 3 illustrates a process 300 for the pre-approval of a simulated installment transaction and subsequent conversion of a payment transaction related thereto to an installment transaction for processing.

In step 302, the consumer 104 may, using the computing device 108, simulate and installment transaction. The simulation may include the selection of one or more installment terms, which may be used in the calculation of additional installment terms, as well as the input of one or more transaction criteria. The installment terms may be desired terms for the simulated installment transaction, such as a desired installment payment amount, number of payments, interest rate, etc. The transaction criteria may include criteria associated with a payment transaction to be converted into the simulated installment transaction, such as a transaction amount, transaction time, transaction date, merchant name, merchant category code, merchant identifier, etc.

In step 304, the consumer 104 may, using the computing device 108, electronically transmit a data signal to the issuer system 106 (e.g., which may be configured to perform the functions of the processing server 102 discussed above) superimposed with a request for pre-approval of the simulated installment transaction. The request may include the simulated installment transaction in addition to data suitable for use in identifying the transaction account to be used in the installment transaction, which may be an identification value such as a primary account number, identification number, username, e-mail address, telephone number, device identifier, etc. In step 306, a transaction processing module 218 of the issuer system 106 may pre-approve the simulated installment transaction. The pre-approval may be based on the account balance and additional account data stored in an account profile 208 related to the involved transaction account as identified via a query executed on an account database 206 by a querying module 214 of the issuer system 106 and the installment terms for the simulated installment transaction.

Once the simulated installment transaction has been pre-approved, in step 308 a transmitting device 220 of the issuer system 106 may electronically transmit a data signal to the processing server 102 via a suitable communication network and method that is superimposed with the pre-approved simulated installment. In some embodiments, the issuer system 106 and processing server 102 may communicate via an application programming interface (API) executed by the processing server 102 and/or the issuer system 106. The data signal may be received by a receiving device 202 of the processing server 102 with the pre-approved installment including at least the primary account number and one or more transaction criteria for use in identifying a payment transaction related thereto. In some embodiments, the processing server 102 and/or issuer system 106 may store the pre-approved installment in a transaction data entry 212 in a transaction database 210 stored therein.

In step 310, the transmitting device 220 of the issuer system 106 may electronically transmit a data signal to the computing device 108 associated with the consumer 104 that is superimposed with a notification that the simulated installment transaction was pre-approved. The computing device 108 may be identified via data included in the submitted request and/or based on data stored in the account profile 208 identified as related to the transaction account for which the pre-approval was requested.

In step 312, the consumer 104 may initiate a payment transaction with the merchant system 110 using traditional systems and methods, and may present the transaction account for which pre-approval was sought for payment of the initiated transaction. In step 314, an authorization request may be electronically transmitted to the processing server 102 originating from the merchant system 110 via the payment rails. The authorization request may be a transaction message related to the payment transaction that includes a message type indicator indicative of an authorization request and a plurality of data elements that includes data elements configured to store the primary account number associated with the transaction account, a transaction amount, and additional transaction data.

In step 316, the processing server 102 may identify that the payment transaction corresponds to a pre-approved installment transaction. The identification may be based on a comparison of the data stored in the data elements included in the received authorization request, including at least the transaction amount, with data corresponding to a pre-approved installment transaction, such as may be identified via the execution of a query on the transaction database 210 of the processing server 102 by the querying module 214. In some embodiments, a transaction time stored in a corresponding data element included in the authorization request must be within a predetermined period of time of receipt or the pre-approval for the installment transaction and/or of a time indicated in the installment transaction. For instance, the consumer 104 may indicate a future time for the simulated installment transaction. The comparison may also include a determination by the verification module 216 of the processing server 102 that the transaction data of the authorization request is in compliance with the one or more transaction criteria included in the pre-approval installment transaction data.

Once the verification module 216 of the processing server 102 has verified that the authorization request corresponds to a pre-approved installment transaction, then, in step 318, the transaction processing module 218 of the processing server may flag the authorization request. The flagging of the authorization request may include storing, in a specific data element of the transaction message, a flag indicating that the payment transaction has been pre-approved for conversion to an installment transaction. In some instances, the flag may be comprised of or may include data indicating the pre-approved installment transaction, such as a transaction identification value. In step 320, the transmitting device 220 of the processing server 102 may electronically transmit the flagged authorization request to the issuer system 106, such as via the payment network 112 and/or the payment rails, to be received by a receiving device 202 of the issuer system 106.

In step 322, a verification module 216 of the issuer system 106 may perform verification of the authorization request to verify the pre-approved installment transaction that corresponds to the authorization request, such as by comparing the transaction data included therein to installment transaction data stored in a transaction database 210 of the issuer system 106 following the pre-approval performed in step 306. In some instances, the verification may include the generation or modification of installment terms for the installment, which may vary from the pre-approved installment terms. Following successful verification, the transmitting device 220 of the issuer system 106 may electronically transmit a data signal to the consumer 104 via the computing device 108 that is superimposed with an installment term request. The installment term request may include one or more installment terms for acceptance by the consumer 104, and may be the installment terms included in the original request for pre-approval of the simulated installment transaction, or may be modifications thereto.

In step 326, the consumer 104 may, using the computing device 108, confirm acceptance of the installment terms. For example, a display device of the computing device 108 may display the installment terms to the consumer 104, and the consumer 104 may use one or more input devices of the computing device 108, such as a mouse, keyboard, touch screen, microphone, etc., to indicate acceptance of the installment terms. In step 328, the computing device 108 may electronically transmit a data signal back to the issuer system 106 that is superimposed with the consumer's acceptance of the installment terms. The receiving device 202 of the issuer system 106 may receive and parse the data signal. In step 330, the issuer system 106 may then approve the transaction. As part of the approval, the transaction processing module 218 may post a charge for the first installment payment to the transaction account associated with the consumer 104. The transaction processing module 218 may also convert the authorization request into an authorization response by modifying the message type indicator and may also store a response code in a corresponding data element in the transaction message that indicates that the transaction was approved. The issuer system 106 may proceed with charging the consumer 104 for future installment payments during the installment period as set forth in the accepted installment terms.

In step 332, the transmitting device 220 of the issuer system 106 may electronically transmit the authorization response to the processing server 102 via the payment network 112 and/or payment rails. In step 334, the authorization response may be forwarded by the transmitting device 220 of the processing server 102 to the merchant system 110. In step 336, the merchant system 110 may finalize the payment transaction with the consumer 104, such as by providing the consumer 104 with the transacted-for goods or services.

Figure 4:
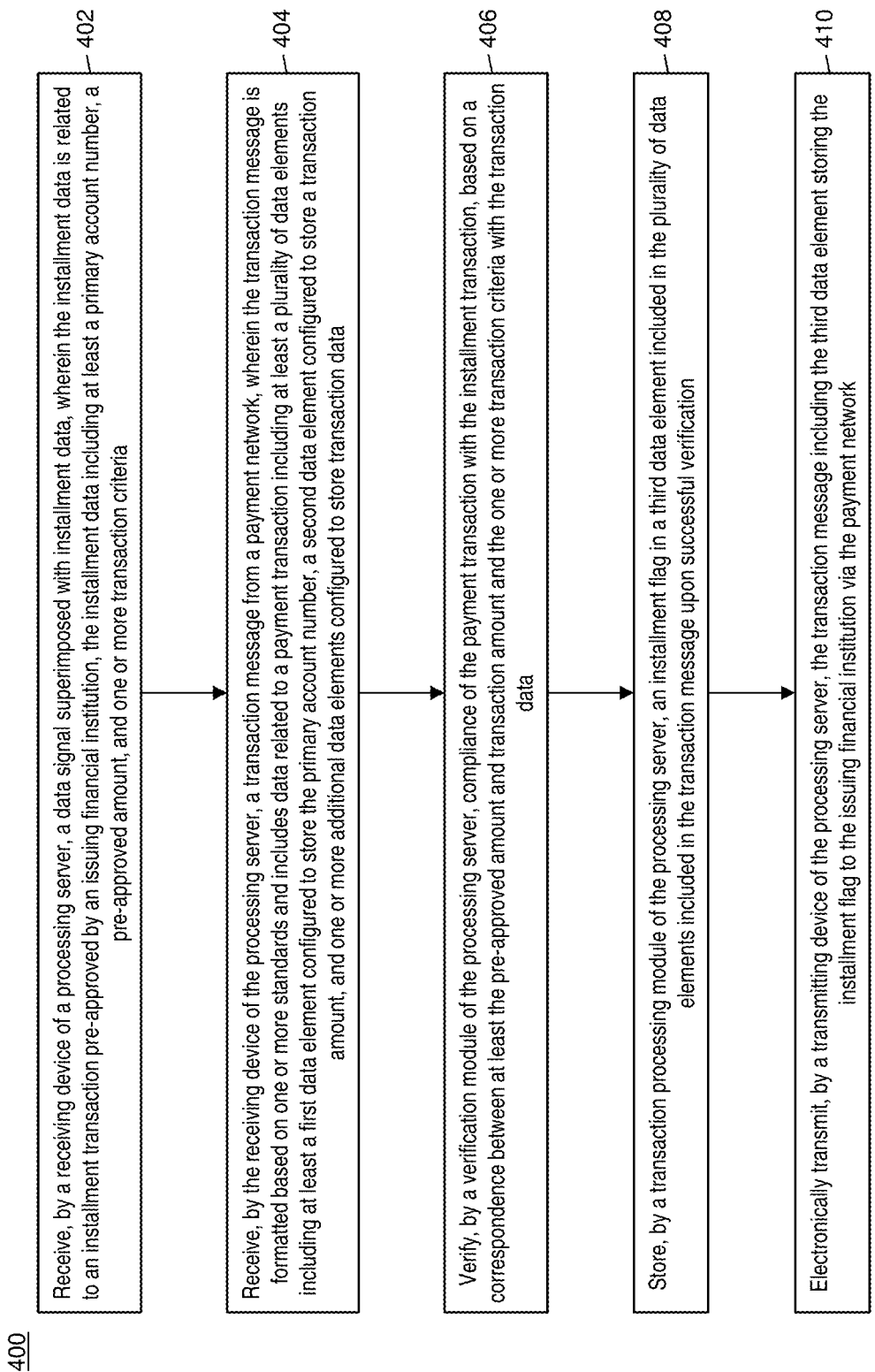
FIG. 4 is a flow chart illustrating an exemplary method for flagging a pre-approved installment transaction for issuer processing in accordance with exemplary embodiments.

Exemplary Method for Flagging a Pre-Approved Installment Transaction for Issuer Processing FIG. 4 illustrates a method 400 for the flagging of a payment transaction that corresponds to an installment transaction pre-approved by an issuing financial institution for processing thereby.

In step 402, a data signal superimposed with installment data may be received by a receiving device (e.g., the receiving device 202) of a processing server (e.g., the processing server 102), wherein the installment data is related to an installment transaction pre-approved by an issuing financial institution (e.g., the issuer system 106), the installment data including at least a primary account number, a pre-approved amount, and one or more transaction criteria. In step 404, a transaction message may be received by the receiving device of the processing server from a payment network (e.g., the payment network 112), wherein the transaction message is formatted based on one or more standards and includes data related to a payment transaction including at least a plurality of data elements including at least a first data element configured to store the primary account number, a second data element configured to store a transaction amount, and one or more additional data elements configured to store transaction data.

In step 406, compliance of the payment transaction with the installment transaction may be verified by a verification module (e.g., the verification module 216) of the processing server based on a correspondence between at least the pre-approved amount and transaction amount and the one or more transaction criteria with the transaction data. In step 408, an installment flag may be stored by a transaction processing module (e.g., the transaction processing module 218) of the processing server in a third data element included in the plurality of data elements included in the transaction message upon successful verification. In step 410, the transaction message including the third data element storing the installment flag may be electronically transmitted by a transmitting device (e.g., the transmitting device 220) of the processing server to the issuing financial institution via the payment network.

In some embodiments, the method 400 may further include storing, in a transaction database (e.g., the transaction database 210) of the processing server, a transaction data entry (e.g., a transaction data entry 212), wherein the transaction data entry is a structured data set related to the installment transaction and includes the installment data. In one embodiment, the correspondence between the pre-approved amount and transaction amount may be indicated by the pre-approved amount being within a predetermined amount of the transaction amount. In a further embodiment, the installment data may further include the predetermined amount. In some embodiments, the one or more transaction criteria may include at least one of: a merchant category code, a merchant identifier, a geographic location, a transaction time and/or date, and product data.

Figure 5:
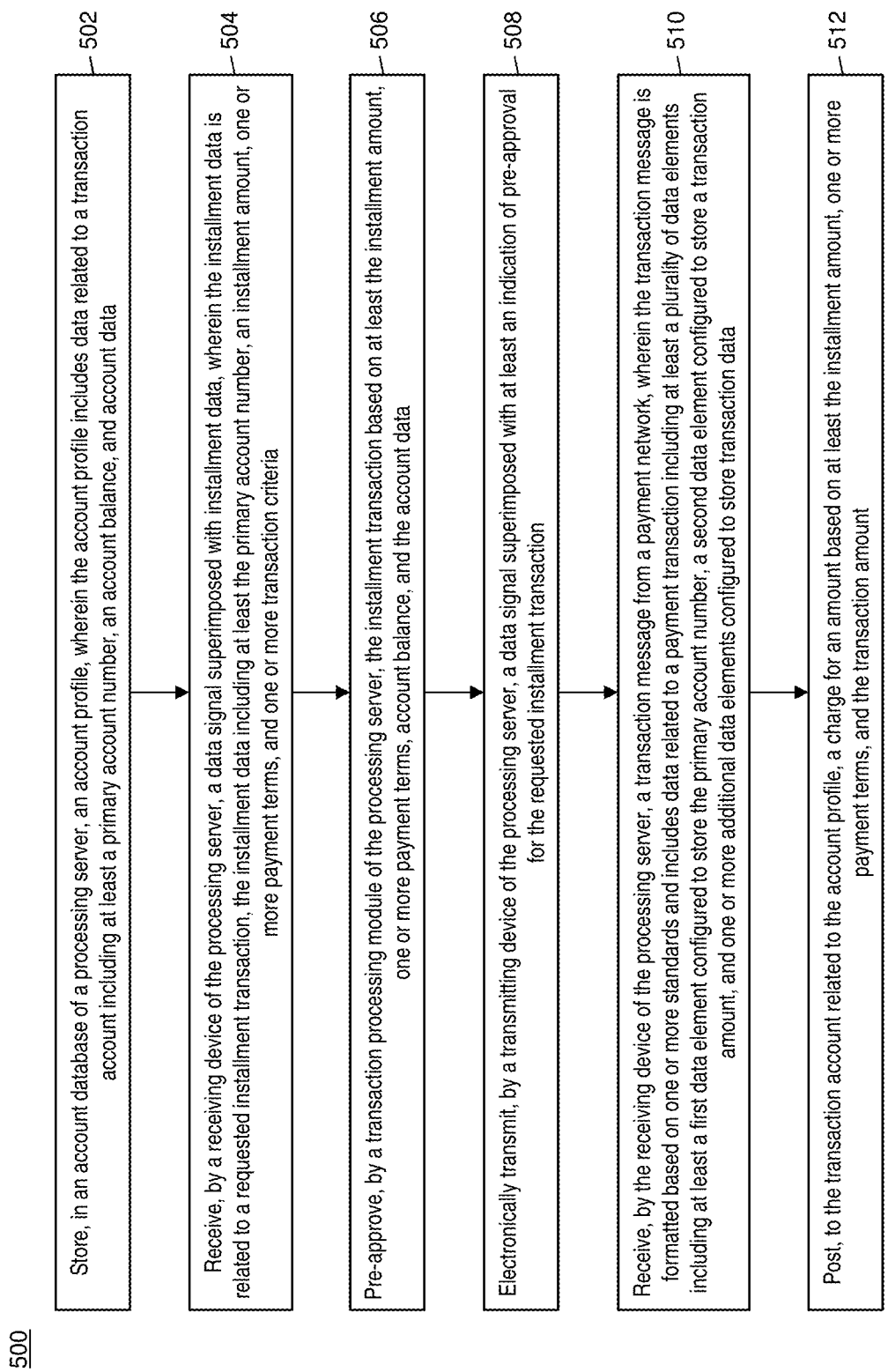
FIG. 5 is a flow chart illustrating an exemplary method for processing a payment transaction as an installment based on pre-approval in accordance with exemplary embodiments.

Exemplary Method for Processing a Payment Transaction as an Installment Based on Pre-Approval FIG. 5 illustrates a method 500 for the processing of a payment transaction as an installment transaction based on correspondence of the payment transaction to a pre-approved installment transaction.

In step 502, an account profile (e.g., account profile 208) may be stored in an account database (e.g., the account database 206) of a processing server (e.g., the processing server 102), wherein the account profile includes data related to a transaction account including at least a primary account number, an account balance, and account data. In step 504, a data signal superimposed with installment data may be received by a receiving device (e.g., the receiving device 202) of the processing server, wherein the installment data is related to a requested installment transaction, the installment data including at least the primary account number, an installment amount, one or more payment terms, and one or more transaction criteria.

In step 506, the installment transaction may be pre-approved by a transaction processing module (e.g., the transaction processing module 218) of the processing server based on at least the installment amount, one or more payment terms, account balance, and the account data. In step 508, a data signal superimposed with at least an indication of pre-approval for the requested installment transaction may be electronically transmitted by a transmitting device (e.g., the transmitting device 220) of the processing server.

In step 510, a transaction message may be received by the receiving device of the processing server from a payment network (e.g., the payment network 112), wherein the transaction message is formatted based on one or more standards and includes data related to a payment transaction including at least a plurality of data elements including at least a first data element configured to store the primary account number, a second data element configured to store a transaction amount, and one or more additional data elements configured to store transaction data. In step 512, a charge for an amount based on at least the installment amount, one or more payment terms, and the transaction amount may be posted to the transaction account related to the account profile.

In some embodiments, the method 500 may further include executing, by a querying module (e.g., the querying module 214) of the processing server, a query on the account database to store, in the account profile, the installment data. In one embodiment, the method 500 may also include verifying, by a verification module (e.g., the verification module 216) of the processing server, compliance of the payment transaction with the installment transaction, based on a correspondence between at least the installment amount and transaction amount and the one or more transaction criteria with the transaction data.

In some embodiments, the transaction message may further include a third data element configured to store an installment flag. In one embodiment, pre-approving the installment transaction may include modifying at least one of: the installment amount and at least one of the one or more payment terms, the account profile may further include communication data, and the method may further comprise: electronically transmitting, by the transmitting device of the processing server, a data signal superimposed with at least the modified installment amount and/or payment terms to a computing device (e.g., the computing device 108) associated with the related transaction account using the communication data; and receiving, by the receiving device, a data signal superimposed with an indication of approval of the modified installment amount and/or payment terms from the computing device.

Payment Transaction Processing System and Process

Figure 6:
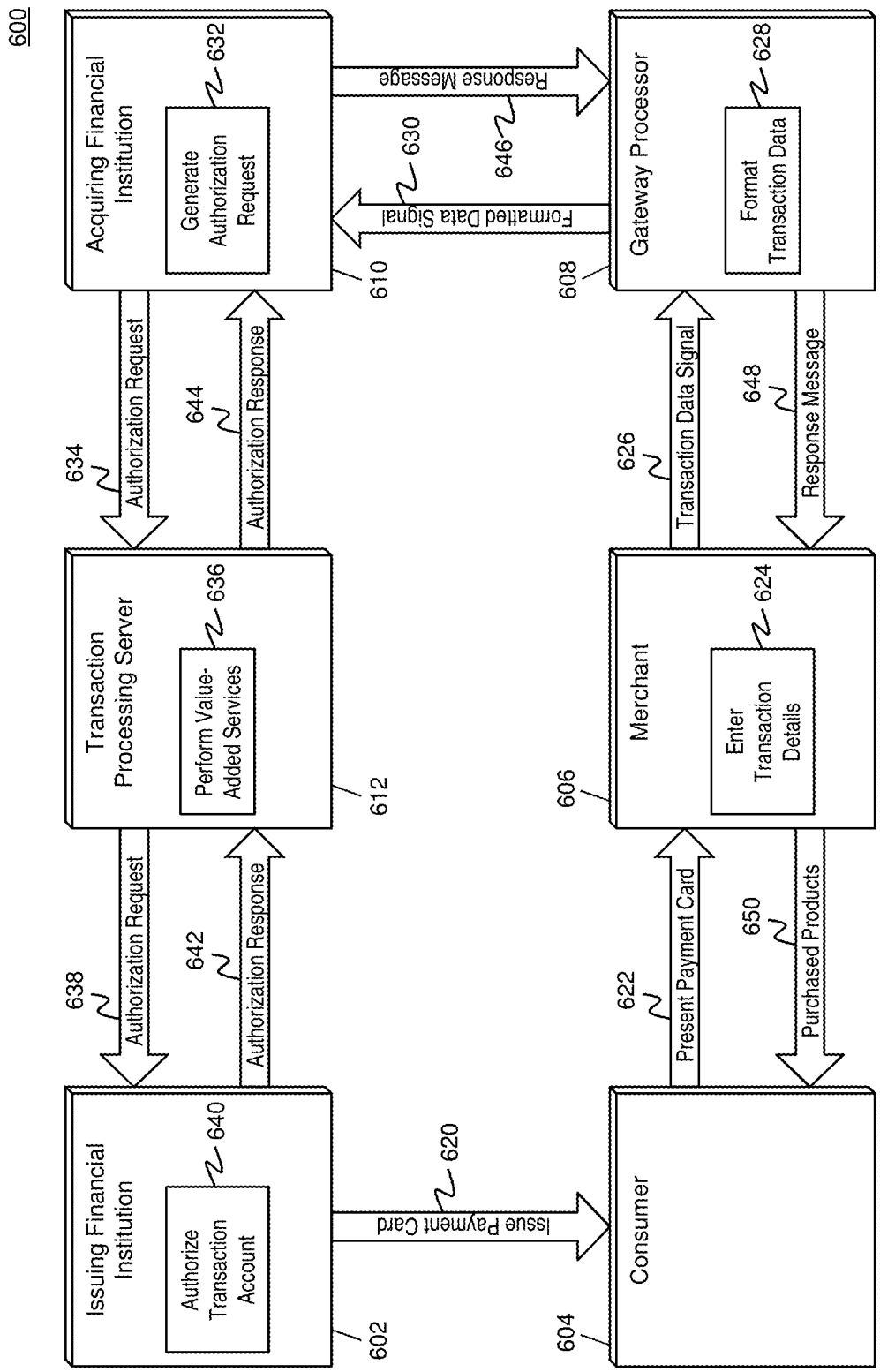
FIG. 6 is a flow diagram illustrating the processing of a payment transaction in accordance with exemplary embodiments.

FIG. 6 illustrates a transaction processing system and a process 600 for the processing of payment transactions in the system. The process 600 and steps included therein may be performed by one or more components of the system 100 discussed above, such as the processing server 102, consumer 104, issuer system 106, computing device 108, merchant system 110, payment network 112, etc. The processing of payment transactions using the system and process 600 illustrated in FIG. 6 and discussed below may utilize the payment rails, which may be comprised of the computing devices and infrastructure utilized to perform the steps of the process 600 as specially configured and programmed by the entities discussed below, including the transaction processing server 612, which may be associated with one or more payment networks configured to processing payment transactions. It will be apparent to persons having skill in the relevant art that the process 600 may be incorporated into the processes illustrated in FIGS. 3-5, discussed above, with respect to the step or steps involved in the processing of a payment transaction. In addition, the entities discussed herein for performing the process 600 may include one or more computing devices or systems configured to perform the functions discussed below. For instance, the merchant 606 may be comprised of one or more point of sale devices, a local communication network, a computing server, and other devices configured to perform the functions discussed below.

In step 620, an issuing financial institution 602 may issue a payment card or other suitable payment instrument to a consumer 604. The issuing financial institution may be a financial institution, such as a bank, or other suitable type of entity that administers and manages payment accounts and/or payment instruments for use with payment accounts that can be used to fund payment transactions. The consumer 604 may have a transaction account with the issuing financial institution 602 for which the issued payment card is associated, such that, when used in a payment transaction, the payment transaction is funded by the associated transaction account. In some embodiments, the payment card may be issued to the consumer 604 physically. In other embodiments, the payment card may be a virtual payment card or otherwise provisioned to the consumer 604 in an electronic format.

In step 622, the consumer 604 may present the issued payment card to a merchant 606 for use in funding a payment transaction. The merchant 606 may be a business, another consumer, or any entity that may engage in a payment transaction with the consumer 604. The payment card may be presented by the consumer 604 via providing the physical card to the merchant 606, electronically transmitting (e.g., via near field communication, wireless transmission, or other suitable electronic transmission type and protocol) payment details for the payment card, or initiating transmission of payment details to the merchant 606 via a third party. The merchant 606 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 624, the merchant 606 may enter transaction details into a point of sale computing system. The transaction details may include the payment details provided by the consumer 604 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 606 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 606 may be an online retailer in an e-commerce transaction. In such embodiments, the transaction details may be entered in a shopping cart or other repository for storing transaction data in an electronic transaction as will be apparent to persons having skill in the relevant art.

In step 626, the merchant 606 may electronically transmit a data signal superimposed with transaction data to a gateway processor 608. The gateway processor 608 may be an entity configured to receive transaction details from a merchant 606 for formatting and transmission to an acquiring financial institution 610. In some instances, a gateway processor 608 may be associated with a plurality of merchants 606 and a plurality of acquiring financial institutions 610. In such instances, the gateway processor 608 may receive transaction details for a plurality of different transactions involving various merchants, which may be forwarded on to appropriate acquiring financial institutions 610. By having relationships with multiple acquiring financial institutions 610 and having the requisite infrastructure to communicate with financial institutions using the payment rails, such as using application programming interfaces associated with the gateway processor 608 or financial institutions used for the submission, receipt, and retrieval of data, a gateway processor 608 may act as an intermediary for a merchant 606 to be able to conduct payment transactions via a single communication channel and format with the gateway processor 608, without having to maintain relationships with multiple acquiring financial institutions 610 and payment processors and the hardware associated thereto. Acquiring financial institutions 610 may be financial institutions, such as banks, or other entities that administers and manages payment accounts and/or payment instruments for use with payment accounts. In some instances, acquiring financial institutions 610 may manage transaction accounts for merchants 606. In some cases, a single financial institution may operate as both an issuing financial institution 602 and an acquiring financial institution 610.

The data signal transmitted from the merchant 606 to the gateway processor 608 may be superimposed with the transaction details for the payment transaction, which may be formatted based on one or more standards. In some embodiments, the standards may be set forth by the gateway processor 608, which may use a unique, proprietary format for the transmission of transaction data to/from the gateway processor 608. In other embodiments, a public standard may be used, such as the International Organization for Standardization's ISO 8683 standard. The standard may indicate the types of data that may be included, the formatting of the data, how the data is to be stored and transmitted, and other criteria for the transmission of the transaction data to the gateway processor 608.

In step 628, the gateway processor 608 may parse the transaction data signal to obtain the transaction data superimposed thereon and may format the transaction data as necessary. The formatting of the transaction data may be performed by the gateway processor 608 based on the proprietary standards of the gateway processor 608 or an acquiring financial institution 610 associated with the payment transaction. The proprietary standards may specify the type of data included in the transaction data and the format for storage and transmission of the data. The acquiring financial institution 610 may be identified by the gateway processor 608 using the transaction data, such as by parsing the transaction data (e.g., deconstructing into data elements) to obtain an account identifier included therein associated with the acquiring financial institution 610. In some instances, the gateway processor 608 may then format the transaction data based on the identified acquiring financial institution 610, such as to comply with standards of formatting specified by the acquiring financial institution 610. In some embodiments, the identified acquiring financial institution 610 may be associated with the merchant 606 involved in the payment transaction, and, in some cases, may manage a transaction account associated with the merchant 606.

In step 630, the gateway processor 608 may electronically transmit a data signal superimposed with the formatted transaction data to the identified acquiring financial institution 610. The acquiring financial institution 610 may receive the data signal and parse the signal to obtain the formatted transaction data superimposed thereon. In step 632, the acquiring financial institution may generate an authorization request for the payment transaction based on the formatted transaction data. The authorization request may be a specially formatted transaction message that is formatted pursuant to one or more standards, such as the ISO 8683 standard and standards set forth by a payment processor used to process the payment transaction, such as a payment network. The authorization request may be a transaction message that includes a message type indicator indicative of an authorization request, which may indicate that the merchant 606 involved in the payment transaction is requesting payment or a promise of payment from the issuing financial institution 602 for the transaction. The authorization request may include a plurality of data elements, each data element being configured to store data as set forth in the associated standards, such as for storing an account number, application cryptogram, transaction amount, issuing financial institution 602 information, etc.

In step 634, the acquiring financial institution 610 may electronically transmit the authorization request to a transaction processing server 612 for processing. The transaction processing server 612 may be comprised of one or more computing devices as part of a payment network configured to process payment transactions. In some embodiments, the authorization request may be transmitted by a transaction processor at the acquiring financial institution 610 or other entity associated with the acquiring financial institution. The transaction processor may be one or more computing devices that include a plurality of communication channels for communication with the transaction processing server 612 for the transmission of transaction messages and other data to and from the transaction processing server 612. In some embodiments, the payment network associated with the transaction processing server 612 may own or operate each transaction processor such that the payment network may maintain control over the communication of transaction messages to and from the transaction processing server 612 for network and informational security.

In step 636, the transaction processing server 612 may perform value-added services for the payment transaction. Value-added services may be services specified by the issuing financial institution 602 that may provide additional value to the issuing financial institution 602 or the consumer 604 in the processing of payment transactions. Value-added services may include, for example, fraud scoring, transaction or account controls, account number mapping, offer redemption, loyalty processing, etc. For instance, when the transaction processing server 612 receives the transaction, a fraud score for the transaction may be calculated based on the data included therein and one or more fraud scoring algorithms and/or engines. In some instances, the transaction processing server 612 may first identify the issuing financial institution 602 associated with the transaction, and then identify any services indicated by the issuing financial institution 602 to be performed. The issuing financial institution 602 may be identified, for example, by data included in a specific data element included in the authorization request, such as an issuer identification number. In another example, the issuing financial institution 602 may be identified by the primary account number stored in the authorization request, such as by using a portion of the primary account number (e.g., a bank identification number) for identification.

In step 638, the transaction processing server 612 may electronically transmit the authorization request to the issuing financial institution 602. In some instances, the authorization request may be modified, or additional data included in or transmitted accompanying the authorization request as a result of the performance of value-added services by the transaction processing server 612. In some embodiments, the authorization request may be transmitted to a transaction processor (e.g., owned or operated by the transaction processing server 612) situated at the issuing financial institution 602 or an entity associated thereof, which may forward the authorization request to the issuing financial institution 602.

In step 640, the issuing financial institution 602 may authorize the transaction account for payment of the payment transaction. The authorization may be based on an available credit amount for the transaction account and the transaction amount for the payment transaction, fraud scores provided by the transaction processing server 612, and other considerations that will be apparent to persons having skill in the relevant art. The issuing financial institution 602 may modify the authorization request to include a response code indicating approval (e.g., or denial if the transaction is to be denied) of the payment transaction. The issuing financial institution 602 may also modify a message type indicator for the transaction message to indicate that the transaction message is changed to be an authorization response. In step 642, the issuing financial institution 602 may transmit (e.g., via a transaction processor) the authorization response to the transaction processing server 612.

In step 644, the transaction processing server 612 may forward the authorization response to the acquiring financial institution 610 (e.g., via a transaction processor). In step 646, the acquiring financial institution may generate a response message indicating approval or denial of the payment transaction as indicated in the response code of the authorization response, and may transmit the response message to the gateway processor 608 using the standards and protocols set forth by the gateway processor 608. In step 648, the gateway processor 608 may forward the response message to the merchant 606 using the appropriate standards and protocols. In step 650, assuming the transaction was approved, the merchant 606 may then provide the products purchased by the consumer 604 as part of the payment transaction to the consumer 604.

In some embodiments, once the process 600 has completed, payment from the issuing financial institution 602 to the acquiring financial institution 610 may be performed. In some instances, the payment may be made immediately or within one business day. In other instances, the payment may be made after a period of time, and in response to the submission of a clearing request from the acquiring financial institution 610 to the issuing financial institution 602 via the transaction processing server 602. In such instances, clearing requests for multiple payment transactions may be aggregated into a single clearing request, which may be used by the transaction processing server 612 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 640), the transaction processing server 612 may be configured to perform authorization of transactions on behalf of the issuing financial institution 602. Such actions may be referred to as "stand-in processing," where the transaction processing server "stands in" as the issuing financial institution 602. In such instances, the transaction processing server 612 may utilize rules set forth by the issuing financial institution 602 to determine approval or denial of the payment transaction, and may modify the transaction message accordingly prior to forwarding to the acquiring financial institution 610 in step 644. The transaction processing server 612 may retain data associated with transactions for which the transaction processing server 612 stands in, and may transmit the retained data to the issuing financial institution 602 once communication is reestablished. The issuing financial institution 602 may then process transaction accounts accordingly to accommodate for the time of lost communication.

In another example, if the transaction processing server 612 is unavailable for submission of the authorization request by the acquiring financial institution 610, then the transaction processor at the acquiring financial institution 610 may be configured to perform the processing of the transaction processing server 612 and the issuing financial institution 602. The transaction processor may include rules and data suitable for use in making a determination of approval or denial of the payment transaction based on the data included therein. For instance, the issuing financial institution 602 and/or transaction processing server 612 may set limits on transaction type, transaction amount, etc. that may be stored in the transaction processor and used to determine approval or denial of a payment transaction based thereon. In such instances, the acquiring financial institution 610 may receive an authorization response for the payment transaction even if the transaction processing server 612 is unavailable, ensuring that transactions are processed and no downtime is experienced even in instances where communication is unavailable. In such cases, the transaction processor may store transaction details for the payment transactions, which may be transmitted to the transaction processing server 612 (e.g., and from there to the associated issuing financial institutions 602) once communication is reestablished.

In some embodiments, transaction processors may be configured to include a plurality of different communication channels, which may utilize multiple communication cards and/or devices, to communicate with the transaction processing server 612 for the sending and receiving of transaction messages. For example, a transaction processor may be comprised of multiple computing devices, each having multiple communication ports that are connected to the transaction processing server 612. In such embodiments, the transaction processor may cycle through the communication channels when transmitting transaction messages to the transaction processing server 612, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 610 may identify that an authorization request involves an issuing financial institution 602 (e.g., via the bank identification number included in the transaction message) for which no value-added services are required. The transaction processor at the acquiring financial institution 610 may then transmit the authorization request directly to the transaction processor at the issuing financial institution 602 (e.g., without the authorization request passing through the transaction processing server 612), where the issuing financial institution 602 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 612 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 608, acquiring financial institution 610, etc.) for processing using this advanced network, and to quickly and efficiently receive a response regarding the ability for a consumer 604 to fund the payment transaction.

Computer System Architecture

Figure 7:
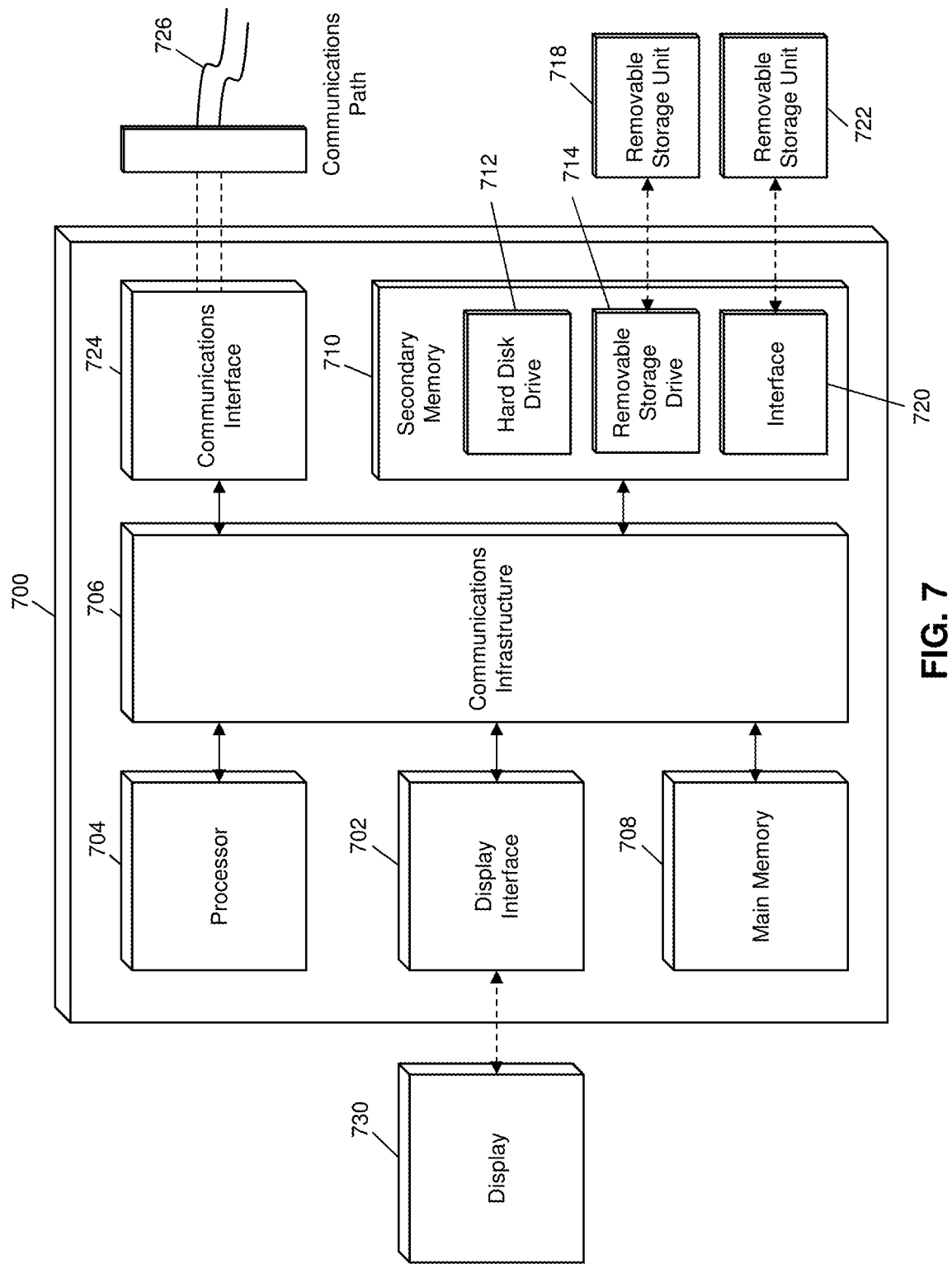
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 102 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc.

Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for pre-approval of installment transactions and the processing of payment transactions corresponding thereto. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for flagging a pre-approved installment transaction for issuer processing, comprising:
    receiving, by a receiving device of a processing server, from an issuer system, a data signal superimposed with installment data, wherein the installment data is related to an installment transaction pre-approved by the issuer system, the installment data including at least a primary account number, a pre-approved amount, and one or more transaction criteria;
    communicating, by the receiving device of the processing server, with a payment network using payment rails, wherein said payment rails are specially configured infrastructure associated with the payment network;
    receiving, by the receiving device of the processing server, a transaction message from the payment network, via the payment rails, wherein the transaction message is specially formatted and includes data related to a payment transaction including at least a plurality of data elements including at least (i) a first data element storing the primary account number, (ii) a second data element storing a transaction amount, and (iii) one or more additional data elements storing transaction data;
    verifying, by a verification module of the processing server, compliance of the payment transaction with the installment transaction, based on a correspondence between at least the pre-approved amount and transaction amount and the one or more transaction criteria with the transaction data stored in the one or more additional data element of the transaction message received from the payment network;
    upon successful verification, modifying, by a transaction processing module of the processing server, the transaction message received from the payment network by storing an installment flag in a third data element included in the plurality of data elements included in the transaction message; and
    electronically transmitting, by a transmitting device of the processing server, the modified transaction message including the third data element storing the installment flag to the issuing system via the payment network.

2. The method of claim 1, further comprising:
    storing, in a transaction database of the processing server, a transaction data entry, wherein the transaction data entry is a structured data set related to the installment transaction and includes the installment data.

3. The method of claim 1, wherein the correspondence between the pre-approved amount and transaction amount is indicated by the pre-approved amount being within a predetermined amount of the transaction amount.

4. The method of claim 3, wherein the installment data further includes the predetermined amount.

5. The method of claim 1, wherein the one or more transaction criteria includes at least one of: a merchant category code, a merchant identifier, a geographic location, a transaction time and/or date, and product data.

6. A method for processing a payment transaction as an installment based on pre-approval, comprising:
storing, in an account database of a processing server, an account profile, wherein the account profile includes data related to a transaction account including at least a primary account number, an account balance, and account data;
receiving, by a receiving device of the processing server, from a mobile device, a data signal superimposed with installment data, wherein the installment data is related to a requested installment transaction, the installment data including at least the primary account number, an installment amount, one or more payment terms, and one or more transaction criteria;
pre-approving, by a transaction processing module of the processing server, the installment transaction based on at least the installment amount, one or more payment terms, account balance, and the account data;
electronically transmitting, by a transmitting device of the processing server, a data signal superimposed with at least an indication of pre-approval for the requested installment transaction;
communicating, by the receiving device of the processing server, with a payment network using payment rails, wherein said payment rails are specially configured infrastructure associated with the payment network;
receiving, by the receiving device of the processing server, a transaction message from the payment network, via the payment rails, wherein the transaction message is specially formatted and includes data related to a payment transaction including at least a plurality of data elements including at least (i) a first data element storing the primary account number, (ii) a second data element storing a transaction amount, and (iii) one or more additional data elements storing transaction data; and
posting, to the transaction account related to the account profile, a charge for an amount based on at least the installment amount, one or more payment terms, and the transaction amount.

7. The method of claim 6, further comprising:
executing, by a querying module of the processing server, a query on the account database to store, in the account profile, the installment data.

8. The method of claim 6, wherein the transaction message further includes a third data element storing an installment flag.

9. The method of claim 6, further comprising:
verifying, by a verification module of the processing server, compliance of the payment transaction with the installment transaction, based on a correspondence between at least the installment amount and transaction amount and the one or more transaction criteria with the transaction data.

10. The method of claim 6, wherein
pre-approving the installment transaction includes modifying at least one of: the installment amount and at least one of the one or more payment terms,
the account profile further includes communication data, and
the method further comprises:
electronically transmitting, by the transmitting device of the processing server, a data signal superimposed with at least the modified installment amount and/or payment terms to a computing device associated with the related transaction account using the communication data; and
receiving, by the receiving device, a data signal superimposed with an indication of approval of the modified installment amount and/or payment terms from the computing device.

11. A system for flagging a pre-approved installment transaction for issuer processing, comprising:
a receiving device of a processing server configured to
receive a data signal superimposed with installment data from an issuer system, wherein the installment data is related to an installment transaction pre-approved by the issuer system, the installment data including at least a primary account number, a pre-approved amount, and one or more transaction criteria,
communicate with a payment network using payment rails, wherein said payment rails are specially configured infrastructure associated with the payment network; and
receive a transaction message from the payment network, via the payment rails, wherein the transaction message is specially formatted and includes data related to a payment transaction including at least a plurality of data elements including at least (i) a first data element storing the primary account number, (ii) a second data element storing a transaction amount, and (iii) one or more additional data elements storing transaction data;
a verification module of the processing server configured to verify compliance of the payment transaction with the installment transaction, based on a correspondence between at least the pre-approved amount and transaction amount and the one or more transaction criteria with the transaction data stored in the one or more additional data element of the transaction message received from the payment network;
a transaction processing module of the processing server configured to, upon successful verification, modify the transaction message received from the payment network by storing an installment flag in a third data element included in the plurality of data elements included in the transaction message; and
a transmitting device of the processing server configured to electronically transmit the modified transaction message including the third data element storing the installment flag to the issuer system via the payment network.

12. The system of claim 11, further comprising:
a transaction database of the processing server configured to store a transaction data entry, wherein the transaction data entry is a structured data set related to the installment transaction and includes the installment data.

13. The system of claim 11, wherein the correspondence between the pre-approved amount and transaction amount is indicated by the pre-approved amount being within a predetermined amount of the transaction amount.

14. The system of claim 13, wherein the installment data further includes the predetermined amount.

15. The system of claim 11, wherein the one or more transaction criteria includes at least one of: a merchant category code, a merchant identifier, a geographic location, a transaction time and/or date, and product data.

16. A system for processing a payment transaction as an installment based on pre-approval, comprising:
an account database of a processing server configured to store an account profile, wherein the account profile includes data related to a transaction account including at least a primary account number, an account balance, and account data;

a receiving device of the processing server configured to receive, from a mobile device, a data signal superimposed with installment data, wherein the installment data is related to a requested installment transaction, the installment data including at least the primary account number, an installment amount, one or more payment terms, and one or more transaction criteria;

a transaction processing module of the processing server configured to pre-approve the installment transaction based on at least the installment amount, one or more payment terms, account balance, and the account data; and a transmitting device of the processing server configured to electronically transmit, to the mobile device, a data signal superimposed with at least an indication of pre-approval for the requested installment transaction, wherein the receiving device of the processing server is further configured to communicate with a payment network using payment rails, wherein said payment rails are specially configured infrastructure associated with the payment network;

receive a transaction message from the payment network, via the payment rails, wherein the transaction message is specially formatted and includes data related to a payment transaction including at least a plurality of data elements including at least (i) a first data element storing the primary account number, (ii) a second data element storing a transaction amount, and (iii) one or more additional data elements storing transaction data, and the transaction processing module of the processing server is further configured to post, to the transaction account related to the account profile, a charge for an amount based on at least the installment amount, one or more payment terms, and the transaction amount.

17. The system of claim 16, further comprising:
a querying module of the processing server configured to execute a query on the account database to store, in the account profile, the installment data.

18. The system of claim 16, wherein the transaction message further includes a third data element storing an installment flag.

19. The system of claim 16, further comprising:
a verification module of the processing server configured to verify compliance of the payment transaction with the installment transaction, based on a correspondence between at least the installment amount and transaction amount and the one or more transaction criteria with the transaction data.

20. The system of claim 16, wherein
pre-approving the installment transaction includes modifying at least one of: the installment amount and at least one of the one or more payment terms,
the account profile further includes communication data, and
the transmitting device of the processing server is further configured to electronically transmit a data signal superimposed with at least the modified installment amount and/or payment terms to a computing device associated with the related transaction account using the communication data, and
the receiving device is further configured to receive a data signal superimposed with an indication of approval of the modified installment amount and/or payment terms from the computing device.

* * * * *